(12) United States Patent
Sharma et al.

(10) Patent No.: US 9,582,707 B2
(45) Date of Patent: Feb. 28, 2017

(54) HEAD POSE ESTIMATION USING RGBD CAMERA

(75) Inventors: Piyush Sharma, San Diego, CA (US); Ashwin Swaminathan, San Diego, CA (US); Ramin Rezaiifar, San Diego, CA (US); Qi Xue, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 568 days.

(21) Appl. No.: 13/456,061

(22) Filed: Apr. 25, 2012

(65) Prior Publication Data

US 2012/0293635 A1 Nov. 22, 2012

Related U.S. Application Data

(60) Provisional application No. 61/487,170, filed on May 17, 2011, provisional application No. 61/562,959, filed on Nov. 22, 2011.

(51) Int. Cl.
*H04N 13/02* (2006.01)
*G06K 9/00* (2006.01)
*G06T 7/00* (2006.01)

(52) U.S. Cl.
CPC ........ *G06K 9/00234* (2013.01); *G06T 7/0042* (2013.01); *G06T 2207/10016* (2013.01);
(Continued)

(58) Field of Classification Search
USPC .......................... 348/143–147, 135, 137, 139
See application file for complete search history.

(56) References Cited

U.S. PATENT DOCUMENTS 6,545,706 B1   4/2003   Edwards et al.
2003/0218672 A1*  11/2003   Zhang ...................... H04N 7/15
                                                            348/14.16
(Continued)

FOREIGN PATENT DOCUMENTS

CN      101443791 A     5/2009
CN      101489467 A     7/2009
(Continued)

OTHER PUBLICATIONS

Murphy-Chutorian et al., "Head Pose Estimation in Computer Vision: A Survey", IEEE Transactions on Pattern Analysis and Machine Intelligence, pp. 1-20 (2008).
(Continued)

*Primary Examiner* — Andy Rao
*Assistant Examiner* — Jared Walker
(74) *Attorney, Agent, or Firm* — Silicon Valley Patent Group LLP (57) ABSTRACT

A three-dimensional pose of the head of a subject is determined based on depth data captured in multiple images. The multiple images of the head are captured, e.g., by an RGBD camera. A rotation matrix and translation vector of the pose of the head relative to a reference pose is determined using the depth data. For example, arbitrary feature points on the head may be extracted in each of the multiple images and provided along with corresponding depth data to an Extended Kalman filter with states including a rotation matrix and a translation vector associated with the reference pose for the head and a current orientation and a current position. The three-dimensional pose of the head with respect to the reference pose is then determined based on the rotation matrix and the translation vector.

16 Claims, 6 Drawing Sheets

(52) U.S. Cl.
CPC .............. *G06T 2207/10024* (2013.01); *G06T 2207/10028* (2013.01); *G06T 2207/30201* (2013.01)

(56) References Cited

U.S. PATENT DOCUMENTS

| | | |
|---|---|---|
| 2004/0017930 A1 | 1/2004 | Kim et al. |
| 2006/0187305 A1 | 8/2006 | Trivedi et al. |
| 2007/0052698 A1 | 3/2007 | Funayama et al. |
| 2007/0269108 A1 | 11/2007 | Steinberg et al. |
| 2008/0144925 A1* | 6/2008 | Zhu .................... G06K 9/32 382/154 |
| 2008/0247651 A1 | 10/2008 | Takaki et al. |
| 2008/0278487 A1* | 11/2008 | Gobert .............. G06K 9/00228 345/420 |
| 2009/0129631 A1 | 5/2009 | Faure et al. |
| 2009/0195538 A1* | 8/2009 | Ryu et al. .................. 345/419 |
| 2009/0244309 A1* | 10/2009 | Maison et al. ............ 348/222.1 |
| 2009/0304232 A1* | 12/2009 | Tsukizawa .................. 382/103 |
| 2010/0094460 A1 | 4/2010 | Choi et al. |
| 2010/0161225 A1 | 6/2010 | Hyung et al. |
| 2010/0208057 A1 | 8/2010 | Meier et al. |
| 2010/0329549 A1* | 12/2010 | Steinberg et al. ........... 382/164 |
| 2011/0044504 A1 | 2/2011 | Oi et al. |
| 2011/0205338 A1 | 8/2011 | Choi et al. |

FOREIGN PATENT DOCUMENTS

| | | |
|---|---|---|
| EP | 1646006 A1 | 4/2006 |
| JP | 2006527443 A | 11/2006 |
| JP | 2007514211 A | 5/2007 |
| JP | 2008257649 A | 10/2008 |
| JP | 2011043969 A | 3/2011 |
| WO | WO2004111687 A2 | 12/2004 |
| WO | 2005006251 A1 | 1/2005 |

OTHER PUBLICATIONS

Murphy-Chutorian et al., "Head Pose Estimation in Computer Vision: A Survey", IEEE Transactions on Pattern Analysis and Machine Intelligence, vol. 31, No. 4, pp. 607-626 (2009).
Henry P. et al., "RGB-D Mapping: Using Depth Cameras for Dense 3D Modeling of Indoor," Proc. of International Symposium on Experimental Robotics (ISER), 2010, 15 pages.
Ma Y. et al., "An Invitation to 3-D Vision, From Images to Geometric Models," 2004, Chapter 12, pp. 5.
International Search Report and Written Opinion—PCT/US2012/036362, International Search Authority—European Patent Office, Jun. 8, 2012.
Malassiotis S et al., "Robust Real-Time 3D Head Pose Estimation from Range Data", Pattern Recognition, Elsevier, GB, vol. 38, No. 8, Aug. 1, 2005 (Aug. 1, 2005), pp. 1153-1165. XP027610828, ISSN: 0031-3203[retrieved on Aug. 1, 2005].

\* cited by examiner

HEAD POSE ESTIMATION USING RGBD CAMERA

CROSS-REFERENCE TO RELATED APPLICATION(S)

This application claims priority under 35 USC 119 to U.S. Provisional Application No. 61/487,170, filed May 17, 2011, and entitled "Mapping, Localization and Pose Estimation by a Filtering Method Integrating Optical and Range Data," and U.S. Provisional Application No. 61/562,959, filed Nov. 22, 2011, and entitled "Head Pose Estimation Using RGBD Camera," both of which are assigned to the assignee hereof and which are incorporated herein by reference.

BACKGROUND

Background Field

Embodiments of the subject matter described herein are related generally to pose determination of a subject in images, and more particularly to estimating the three-dimensional pose of a subject's head using images with depth data.

Relevant Background

Many computing devices include cameras that are capable of capturing multiple images, e.g., in a stream of video frames. For example, many personal computers include a camera, such as a web cam, that is capable of capturing images of the user. Additionally, devices, such as cellular telephones, smart phones, and tablet computers typically include cameras of subjects, such as the user with a forward facing camera or others with a back facing camera.

Identifying the location of the subject, and more particularly, the subject's head in the image is useful for many applications, such as telepresence, and gaming. However, identifying and tracking the position of a subject's head in a series of images is problematic for conventional systems.

SUMMARY

A three-dimensional pose, i.e., a pose with 6 degrees of freedom, of the head of a subject is determined based on depth data captured in multiple images. The multiple images of the head are captured, e.g., by an RGBD camera. A rotation matrix and translation vector of the pose of the head relative to a reference pose is determined using the depth data. For example, arbitrary feature points on the head may be extracted in each of the multiple images and provided along with corresponding depth data to an Extended Kalman filter with states including a rotation matrix and a translation vector associated with the reference pose for the head and a current orientation and a current position. The three-dimensional pose of the head with respect to the reference pose is then determined based on the rotation matrix and the translation vector.

In one implementation, a method includes capturing multiple images with depth data of a head of a subject and determining a rotation matrix and a translation vector associated with a pose of the head in the multiple images relative to a reference coordinate frame using the depth data.

In one implementation, an apparatus includes an RGBD camera to capture images with depth data of a head of a subject; and a processor coupled to the RGBD camera to receive multiple images with the depth data of the head of the subject, the processor being configured to determine a rotation matrix and a translation vector associated with a pose of the head in the multiple images relative to a reference coordinate frame using the depth data.

In one implementation, an apparatus includes means for capturing multiple images with depth data of a head of a subject and means for determining a rotation matrix and a translation vector associated with a pose of the head in the multiple images relative to a reference coordinate frame using the depth data.

In one implementation, a non-transitory computer-readable medium including program code to receive multiple images with the depth data of a head of a subject; and program code to determine a rotation matrix and a translation vector associated with a pose of the head in the multiple images relative to a reference coordinate frame using the depth data.

DETAILED DESCRIPTION

Figure 1:
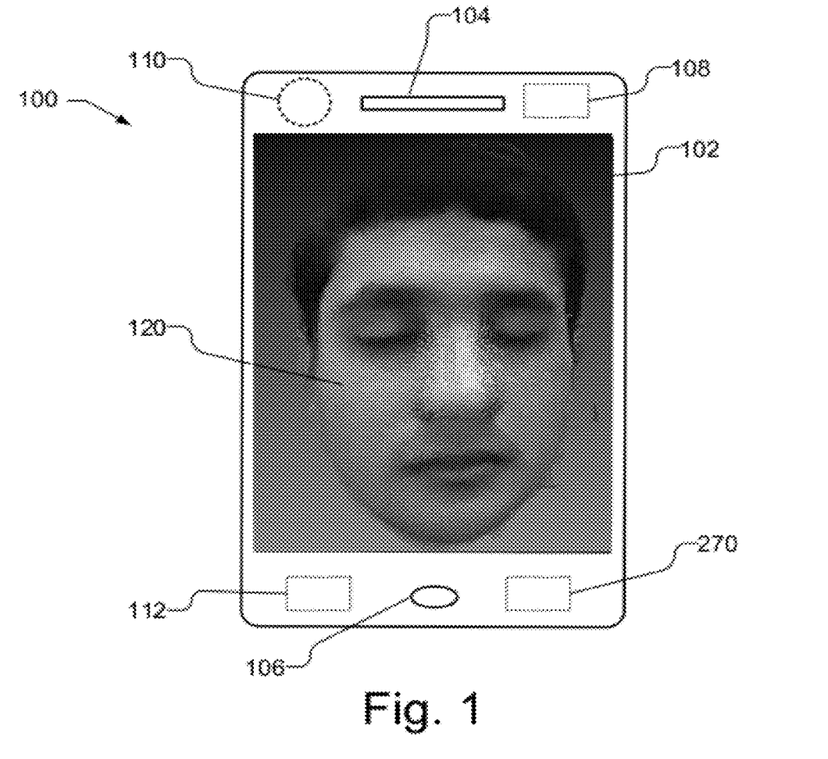
FIG. 1 illustrates a device capable of estimating the three-dimension (3D) pose (orientation and position) of a head using images with depth data.

FIG. 1 illustrates a device 100 capable of estimating the three-dimension (3D) pose (orientation and position) of a subject's head using captured images with depth data, e.g., obtained from a camera 110 with Red, Green, Blue, Distance (RGBD) sensors, referred to herein as RGBD camera 110, or other similar 3D imaging devices. A 3D pose is sometimes referred to as a pose with 6 degrees of freedom. An RGBD camera 110 is a calibrated multi-modal sensor that provides an image (electro-optical, infra-red, or in other electromagnetic bands) and a range map that are mutually aligned, so the RGB value samples the scene's radiance, and the D value samples the depth along the same projection ray.

FIG. 1 illustrates the device 100 as a mobile platform, such as a cellular telephone, which includes a housing 101, a display 102, which may be a touch screen display, as well as a speaker 104 and microphone 106. The display 102 illustrates an image of a head 120 captured by the RGBD camera 110. The device 100 includes an image processing unit 112 for processing images captured by the RGBD camera 110 and an Extend Kalman filter 270 useful in determining an estimate of a head pose, as discussed in more detail below. The RGBD camera 110 is illustrated with dotted lines to indicate that the RGBD camera 110 is located on the back side of the device 100, but the RGBD camera 110, or an additional camera, may be located on the front side of the device 100. The device 100 may further include motion sensors 108, e.g., if the device 100 is a mobile platform. The sensors 108 may be one or more of accelerometers, magnetometers, and/or gyroscopes.

As used herein, a mobile platform refers to any portable electronic device such as a cellular or other wireless communication device, personal communication system (PCS) device, personal navigation device (PND), Personal Information Manager (PIM), Personal Digital Assistant (PDA), laptop or other suitable mobile platform. The mobile platform may be capable of receiving wireless communication and/or navigation signals, such as navigation positioning signals. The term "mobile platform" is also intended to include devices which communicate with a personal navigation device (PND), such as by short-range wireless, infrared, wireline connection, or other connection, regardless of whether satellite signal reception, assistance data reception, and/or position-related processing occurs at the device or at the PND. Also, "mobile platform" is intended to include all electronic devices, including wireless communication devices, computers, laptops, tablet computers, smart phones etc. which are capable of capturing images with depth data of a subject.

It should be understood, however, that while device 100 is sometimes described herein as a mobile platform, the device 100 may be a stationary device or may include one or more stationary components, e.g., the image processing unit 112 and/or Extended Kalman filter 270 may be stationary, while the RGBD camera 110 while being connected to the image processing unit 112 and Extended Kalman filter is itself moveable.

Figure 2:
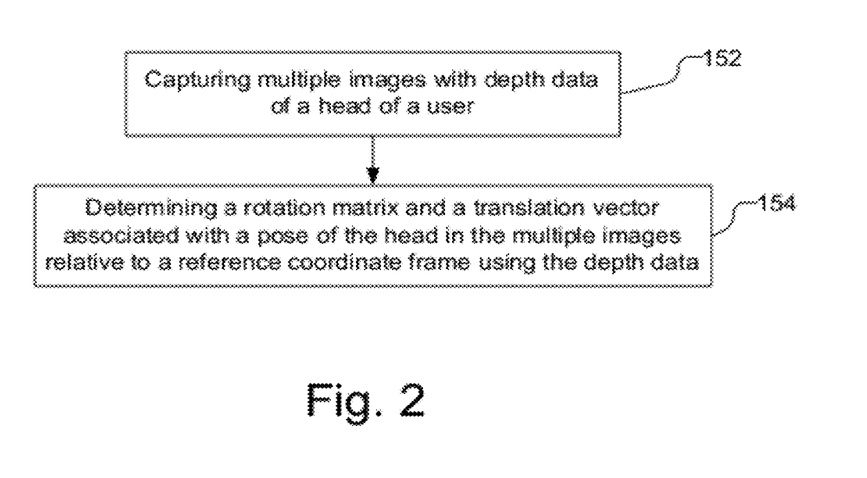
FIG. 2 illustrates a flow chart of a method of estimating a head pose using images with depth data.

FIG. 2 illustrates a flow chart of a method of estimating a head pose using captured images with depth data. As can be seen, multiple images with depth data of a subject's head are captured (152), e.g., using the RGBD camera 110. The images may be captured, e.g., as a series of frames of video. The subject is free to move his/her head while images are captured. A reference pose of the subject head is obtained from one of the captured images and defines a reference coordinate frame. A rotation matrix and a translation vector associated with a pose of the head in the multiple images relative to a reference coordinate frame is determined using the depth data (154). For example, the rotation matrix and a translation vector may be determined in two-dimensions by extracting feature points from images of the head, e.g., on the face. Depth data associated with the tracked feature points can then be used to determine the rotation matrix and the translation vector of the head in three-dimensions. The extracted feature points may be arbitrary. A three-dimensional pose of the head is determined with respect to the reference pose based on the rotation matrix and the translation vector. For example, the image coordinates of the feature points and corresponding depth data may be provided to the Extended Kalman filter 270 with states including the rotation matrix and the translation vector associated with a reference pose for the subject's head and a current orientation and position. The Extended Kalman filter 270 may be used to determine an estimate of the rotation matrix and the translation vector for each of the multiple images relative to the reference pose from which the three-dimensional pose of the subject's head is determined with respect to the reference pose.

Figure 3:
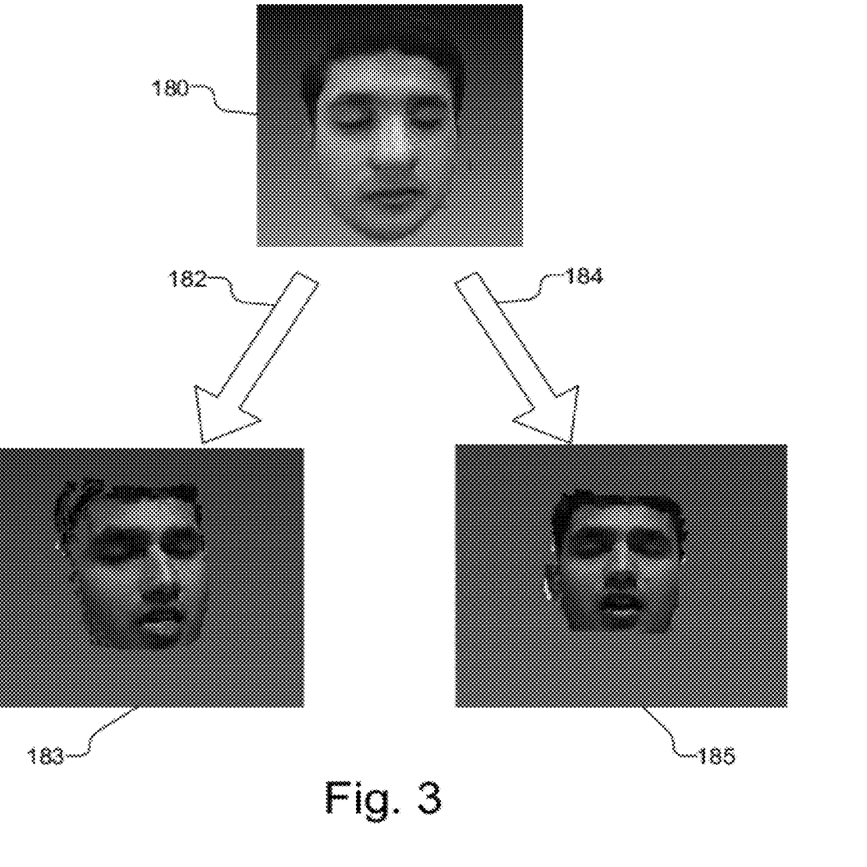
FIG. 3 illustrates images of a subject's head with different poses including a reference image.

FIG. 3 illustrates images of a subject's head with different poses including a reference image 180. By determining the transformations, i.e., rotation matrix and translation vectors illustrated by arrows 182 and 184, that relate the head in any given image 183 and 185, respectively to the reference image 180, the three-dimensional pose of the head with respect to the reference pose may be determined. The three-dimensional pose of the head in any image may be used, e.g., in facial analysis, compression, as well as in gaming, e.g., for visually controlling an avatar.

Figure 4:
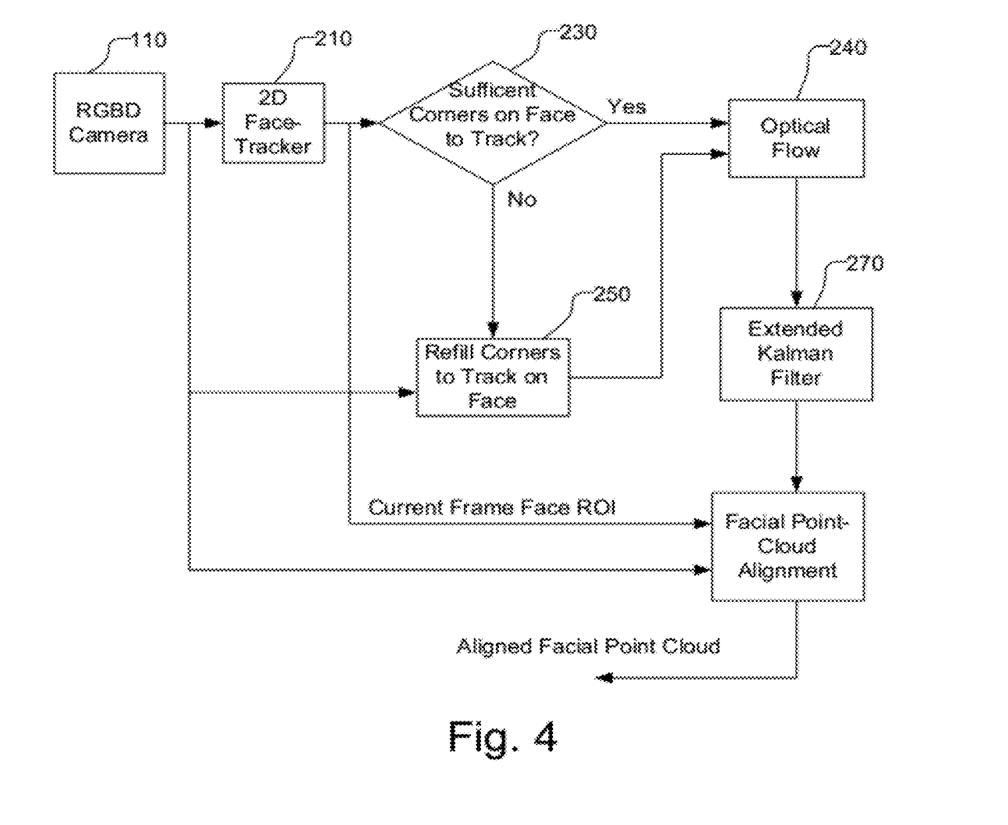
FIG. 4 illustrates a system diagram for estimating a three-dimensional pose of a subject's head using images with depth data.

FIG. 4 illustrates a system diagram for estimating a three-dimensional pose of a subject's head using images with depth data. Images with aligned depth data, e.g., obtained from RGBD camera 110, are provided to a two-dimensional (2D) face tracker 210, which produces a region of interest (ROI) of the subject's face in the current image. The 2D face tracker 210 localizes the face in the RGB image. The 2D face tracker 210 may be based on, e.g., the OpenCV Haar Cascade Classifier or other appropriate facial detection processes. Face tracking operations, such as that performed by OpenCV face detection requires resource intensive computations and also fails with respect to yaw and pitch. Accordingly, it may be desirable to avoid running face detection on every frame. For example, the region of interest (ROI) of the detected face may be saved as a face template and used to detect facial regions of input images using, e.g., Normalized Cross Correlation (NCC). The use of NCC with a previously known face template to update the position (and template itself) is computationally efficient compared to a face detection process.

Figure 5:
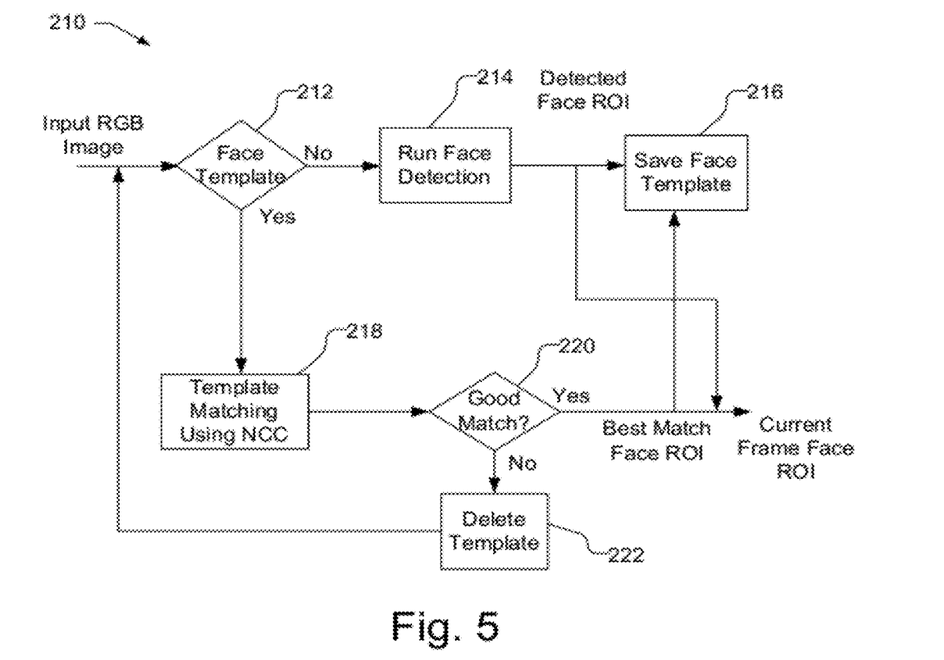
FIG. 5 illustrates an embodiment of the two-dimensional face tracker from FIG. 4.

FIG. 5 illustrates an embodiment of the 2D face tracker 210 from FIG. 4 in which a face template is used to detect facial regions to avoid running computationally intensive face detection process every frame. The 2D face tracker 210 receives the input RGB image and determines if a face template is available (212). If no face template is available, the facial detection process is run (214). As discussed above, the facial detection process may be the OpenCV Haar Cascade Classifier or other appropriate facial detection processes. The region of interest (ROI) of the detected face is saved as a face template (216) and is output as the current frame face ROI. If a face template is available (212), the input image is matched to the face template to detect facial regions using NCC (218). If the input image is determined to be a good match to the face template (220), the best match face ROI is saved as the face template (216) and output from the 2D face tracker 210 as the current frame face ROI. NCC returns a value between −1 and 1 corresponding to each pixel in the query image based on the goodness of the match with respect to the template at that location. The location with the highest NCC value is chosen and if the highest value is greater than a threshold, e.g., 0.7, the location is determined to be a good match. Thus, the 2D face tracker 210 updates the face template after every frame so that the face template is based on the most recent pose of the subject's head. If the input image is determined to not be a good match to the face template (220), the template is deleted (222) and the process returns to step 212.

Returning to FIG. 4, it is determined whether there are sufficient corners to track the face in the current frame (230), e.g., if the number of feature points in the previous frame face ROI is greater than a desired threshold. If there are sufficient corners on the face to track, an optical flow (240) process is performed on the current frame face ROI. The optical flow process may be, e.g., a Lucas-Kanade optical flow, which is well known to those of ordinary skill in the art. If desired, however, other optical flow processes, such as Normalized Cross Correlation, may be used. The system produces a reference frame, which includes the reference pose of the subject's head. Optical flow compares the corners in each subsequent frame to the previous frame. By starting with the reference frame and performing optical flow on subsequent frame pairs, a rotation matrix and a translation vector of a pose of the head relative to the reference pose may be determined.

If it is determined that there are insufficient corners on the face to track (230), the list of corners to be tracked on the face is refilled (250). A face, however, is substantially "texture-less." Consequently, a corner detector, which may use FAST (Features from Accelerated Segment Test) corners or feature detectors from OpenCV, will generally identify corners in the background areas of the images, and thus, it is desirable to segment the face from the background before detecting corners to be tracked. Further, it is desirable to avoid T-junctions, which may appear in images of a face. Additionally, as discussed above, the head pose estimation uses an Extended Kalman filter, which tracks corners from the list of good corners. Thus, when refilling the list of corners, it is desirable to retain the corners that are being tracked so that only new corners are added, while avoiding duplicates.

Figure 6:
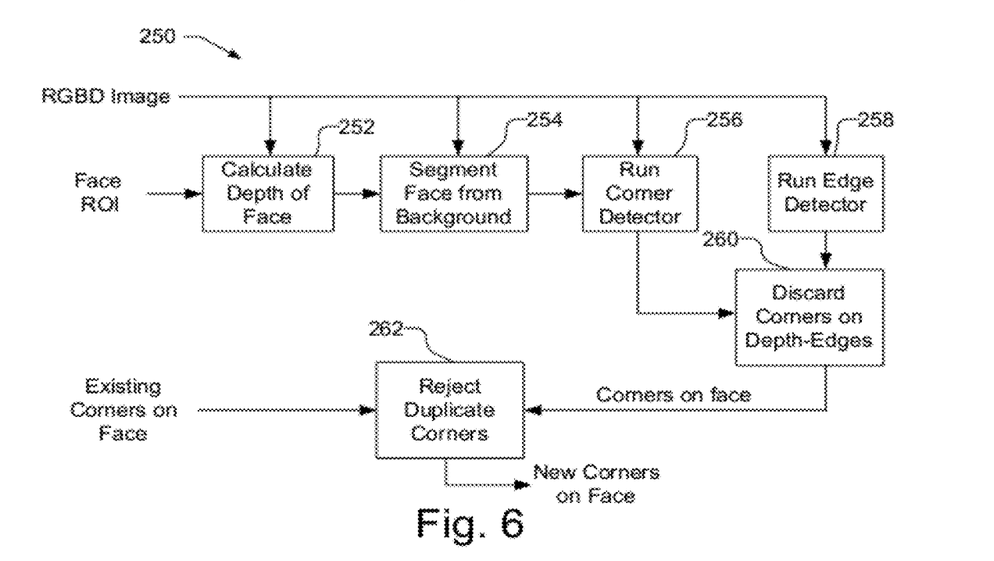
FIG. 6 illustrates an embodiment of refilling the list of good corners to track on the face.

FIG. 6 illustrates an embodiment refilling the list of good corners (250) to track on the face. As illustrated, the depth of the face is calculated (252) based on the depth data from the current RBGD image and the face ROI for the current image provided by the 2D face tracker (210). The depth of the face may be calculated, e.g., based on an average depth of each pixel face ROI or a region within the ROI. The depth of the face is used, along with the depth data from the current RGBD image to segment the face from the background (254) using depth thresholding. For example, any pixel in the RGBD image that is not within a predetermined threshold, e.g., ±4 inches, of the depth of the face may be segmented out of the image to generate a face map. A corner detector (256) is then run on the face in the RBGD image based on the face map. The corner detector may use an OpenCV function "goodfeaturestotrack( )" that uses "minimum eigenvalue of gradients" to find the corners. Alternatively, the corner detector may use Harris corners, FAST corners, or SURF (Speeded Up Robust Feature). Additionally, an edge detector (258), such as a Canny Edge Detector, is run using the depth data from the RGBD image to produce a depth image edge map. Corners in the list of detected corners from the corner detector (256) are discarded (260) if they lie on an edge in the depth image edge map to avoid T-junctions. The resulting list of corners, thus, includes all corners on the face, which are not on edges in the depth image edge map. The resulting list of corners is compared to the existing corners and duplicates are rejected (262) so that new corners on the face are identified. Duplicate corners may be identified based on thresholding. For example, for each identified corner (i.e., provided by step 260), the distance from the closest existing corner is found and compared to a predetermined threshold, e.g., 10 pixels. If the distance is less than the threshold, the corner is rejected as a duplicate. Thus, a new list of corners, without duplicates is generated, and provided to the optical flow (240). Thus, the depth data is used to refill corners from which the optical flow (240) determines point correspondences, which are then used by an Extended Kalman Filter (270) to estimate a rotation matrix and a translation vector of a pose of the head relative to the reference pose.

Figure 7:
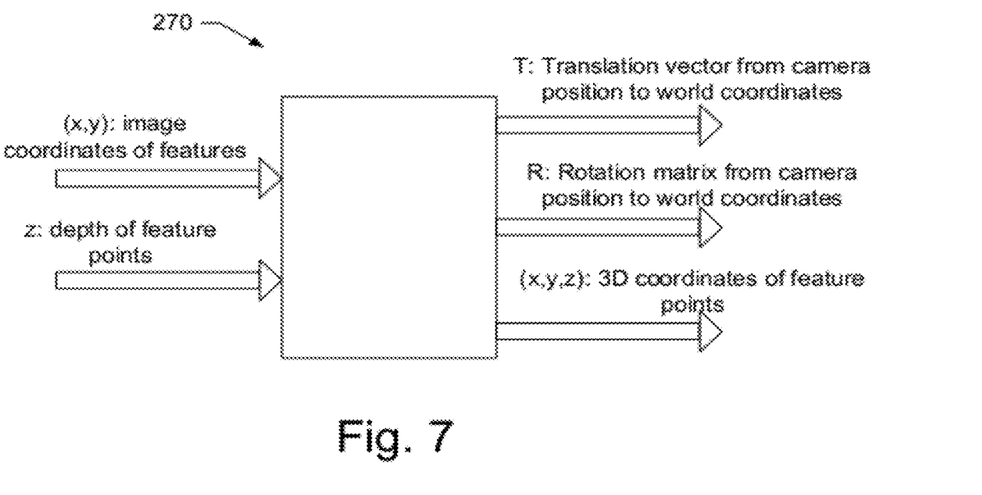
FIG. 7 illustrates an Extended Kalman filter 270 used in the system shown in FIG. 4.

Referring back to FIG. 4, the optical flow (240) process provides point tracking information to an Extended Kalman filter (270). FIG. 7 illustrates the Extended Kalman filter 270 used in the system shown in FIG. 4. The input to the Extended Kalman filter (270) includes the image coordinates (x,y) of the feature points and the depth data (z) for the feature points. The states used with the Extended Kalman filter (270) are the following:

Equations of Motion $$\rho^i(t+1) = \rho^i(t), \; i=1 \ldots N \; \rho^i(0) = \rho_0^i$$

$$T(t+1) = \exp(\hat{\omega}(t))T(t) \; T(0) = T_0$$

$$\Omega(t+1) = \text{Log}_{SO(3)}(\exp(\hat{\omega}(t))\exp(\hat{\Omega}(t))) \; \Omega(0) = \Omega_0$$

$$v(t+1) = v(t) + \alpha_v(t) \; v(0) = v_0$$

$$\omega(t+1) = w(t) + \alpha_\omega(t) \; \omega(0) = \omega_0 \qquad \text{eq. 1}$$

Measurements $$y^i(t) = \pi(\exp(\hat{\Omega}(t))y_0^i(t)\exp(\rho^i(t)) + T(t)) + n^i(t) \; i=1 \ldots N$$

$$\log z^i(t) = \log([0\;0\;1](\exp(\hat{\Omega}(t))y_0^i(t)\exp(\rho^i(t)) + T(t))) + n_z^i(t) \; i=1 \ldots N \qquad \text{eq. 2}$$

where: $y_0^i(t) \in R^2$ are measured, approximately, in the first instant in which they become visible, that for simplicity here is assumed to be the time t=0 (we will describe how to deal with points that disappear, as well as point features that appear at times t>0 later).

$\rho^i(t) \in R$ is the state variable representing the logarithm of the depth of the $i^{th}$ feature point at time t. Logarithmic coordinates are chosen both to enforce the fact that the depth of visible points $\exp(\rho)$ has to be positive, as well as to rectify the distribution of range depth measurement uncertainty from the range portion of the device.

$T(t) \in R^3$ is the state variable representing the translation vector from the camera frame at time t to the world frame.

$\Omega(t) \in so(3)$ is the state variable representing rotation from the camera frame at time t to the world frame.

$v(t) \in R^3$ is the linear velocity of the camera at time t.

$\omega(t) \in R^3$ is the angular velocity of the camera at time t.

$\alpha_v$ and $\alpha_\omega$ are assumed to be zero-mean Gaussian noise processes.

$y^i(t) \in R^2$ is the measured image coordinates in the camera coordinate frame of the $i^{th}$ feature point at time t.

$\log z^i(t) \in R$ is the log of measured depth in the camera coordinate frame of the $i^{th}$ feature point at time t. In practice, the range data is pre-processed to yield the log-depth, and the noise is supposed to be additive in log-scale.

Figure 8:
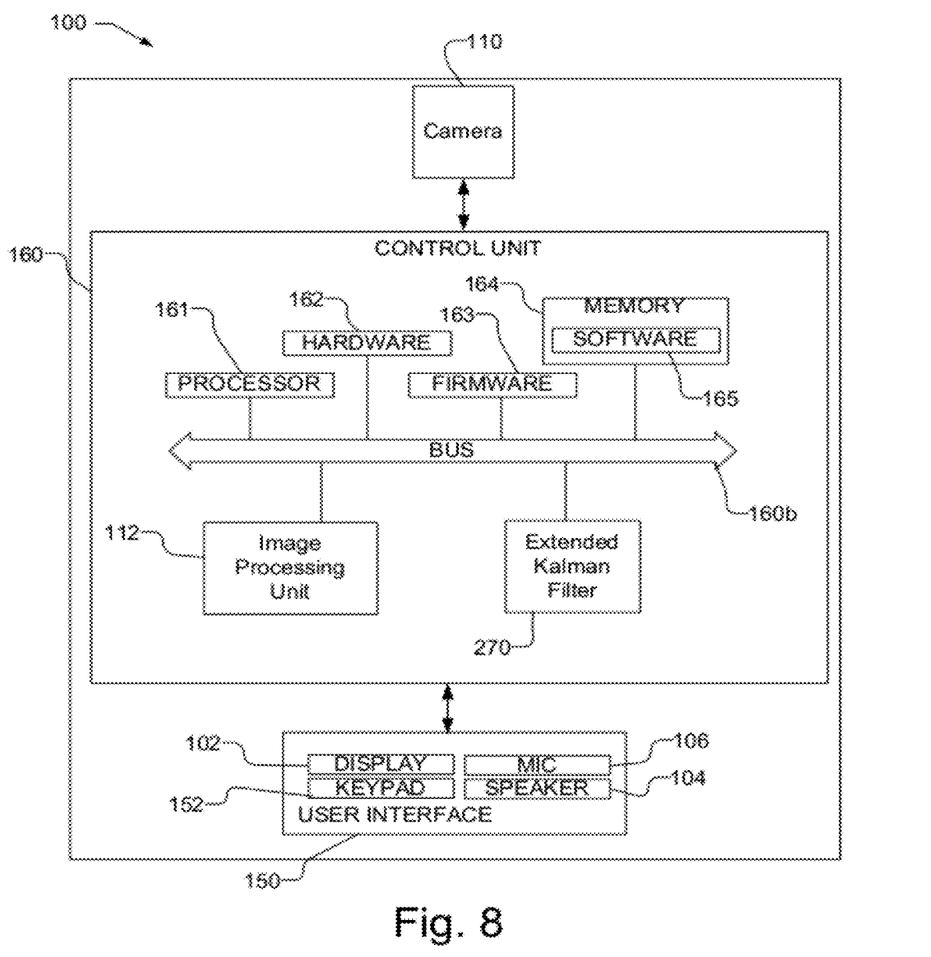
FIG. 8 is a block diagram of a device capable of determining the 3D pose of a subject's head based on captured images with depth data.

The Extended Kalman filter (270) produces a translation vector (T) and rotation matrix (R) from the current camera position to the world coordinates. As illustrated in FIG. 4, the resulting three-dimensional pose of the subject's head from the Extended Kalman filter (270) may be used to combine point clouds from multiple views of the subject, e.g., from the RGBD image and the face ROI for the current frame, to produce an aligned facial point cloud. The aligned facial point cloud, which is posed corrected, may provide a smoother and complete face model, which has many applications, such as in telepresence and gaming FIG. 8 is a block diagram of a device 100 capable of determining a 3D pose (orientation and position) of a subject's head based on captured images with depth data. The device 100 includes a means for capturing images with depth data, such as a RGBD camera 110. The device 100 may further include a user interface 150 that includes a means for displaying the images, such as the display 102. The user interface 150 may also include a keypad 152 or other input device through which the user can input information into the device 100. If desired, the keypad 152 may be obviated by integrating a virtual keypad into the display 102 with a touch sensor (or gesture control). The user interface 150 may also include the microphone 106 and speaker 104, e.g., if the device 100 is a cellular telephone or the like. Of course, device 100 may include other elements unrelated to the present disclosure. For example, the device 100 may include motion sensors, such as one or more of accelerometers, magnetometers, and/or gyroscopes, which may be useful in determining movement of the device.

The device 100 also includes a control unit 160 that is connected to and communicates with the RGBD camera 110. The control unit 160 accepts and processes images and depth data captured by the RGBD camera 110 and controls the display 102. The control unit 160 may be provided by a processor 161 and associated memory 164, hardware 162, software 165, firmware 163, and a bus 160b. The control unit 160 may include an image processing unit 112 that performs various aspects of the process described above, such as the 2D face tracker (210), refilling corners (250) and optical flow (240), as described in FIGS. 4, 5 and 6. The control unit 160 further includes an Extended Kalman filter 270 to determine the three-dimensional pose of the subject's head using the depth data, as described in FIGS. 4 and 7. The three-dimensional pose of the subject's head may be stored in memory 164 or other storage unit and used to determine the pose of the head.

The image processing unit 112 and Extended Kalman filter 270 are illustrated separately from processor 161 for clarity, but may be part of the processor 161 or implemented in the processor based on instructions in the software 165 which is run in the processor 161. It will be understood as used herein that the processor 161 can, but need not necessarily include, one or more microprocessors, embedded processors, controllers, application specific integrated circuits (ASICs), digital signal processors (DSPs), and the like. The term processor is intended to describe the functions implemented by the system rather than specific hardware. Moreover, as used herein the term "memory" refers to any type of computer storage medium, including long term, short term, or other memory associated with the device 100, and is not to be limited to any particular type of memory or number of memories, or type of media upon which memory is stored.

The methodologies described herein may be implemented by various means depending upon the application. For example, these methodologies may be implemented in hardware 162, firmware 163, software 165, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in memory 164 and executed by the processor 161. Memory may be implemented within or external to the processor 161. If implemented in firmware and/or software, the functions may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Although the present invention is illustrated in connection with specific embodiments for instructional purposes, the present invention is not limited thereto. Various adaptations and modifications may be made without departing from the scope of the invention. Therefore, the spirit and scope of the appended claims should not be limited to the foregoing description.

What is claimed is:

1. A method comprising:
   capturing a series of images with depth data of a head of a subject;
   obtaining a reference pose for the head of the subject from one image in the series of images and using the reference pose to define a reference coordinate frame for the series of images;
   determining a rotation matrix and a translation vector associated with a pose of the head in each image in the series of images relative to the reference coordinate frame using the depth data;
   extracting a face on the head from a background in the series of images using the depth data, wherein extracting the face from the background comprises:
      calculating a depth of the face in each image using the depth data; and
      segmenting out the face from the background using a threshold and the depth of the face; and
   tracking the face in the series of images after extracting the face from the background.

2. The method of claim 1, wherein determining the rotation matrix and the translation vector associated with the pose of the head comprises:
   extracting arbitrary feature points on the head in each image in the series of images; and
   using the depth data associated with the arbitrary feature points to determine the rotation matrix and the translation vector of the pose of the head.

3. The method of claim 2, further comprising:
   generating an edge map of the head using the depth data; and
   discarding the arbitrary feature points on edges of the edge map.

4. The method of claim 2, wherein determining the rotation matrix and the translation vector associated with the pose of the head comprises:
   providing image coordinates of the arbitrary feature points and the depth data for corresponding arbitrary feature points to an Extended Kalman filter with states including a rotation matrix and a translation vector associated with the reference pose for the head and a current orientation and a current position; and
   determining the rotation matrix and the translation vector using the Extended Kalman filter.

5. An apparatus comprising:
a Red, Green, Blue, Distance (RGBD) camera to capture images with depth data of a head of a subject; and
a processor coupled to the RGBD camera to receive a series of images with the depth data of the head of the subject, the processor being configured to obtain a reference pose for the head of the subject from one image in the series of images and use the reference pose to define a reference coordinate frame for the series of images; determine a rotation matrix and a translation vector associated with a pose of the head in each image in the series of images relative to the reference coordinate frame using the depth data, wherein the processor is further configured to extract a face on the head from a background in the series of images using the depth data; and track the face in the series of images after extracting the face from the background, wherein the processor is configured to extract the face from the background by being configured to calculate a depth of the face in each image using the depth data; and segment out the face from the background with a threshold and the depth of the face.

6. The apparatus of claim 5, wherein the processor is configured to determine the rotation matrix and the translation vector associated with the pose of the head by being configured to:
extract arbitrary feature points on the head in each image in the series of images; and
use the depth data associated with the arbitrary feature points to determine the rotation matrix and the translation vector of the pose of the head.

7. The apparatus of claim 6, wherein the processor is further configured to:
generate an edge map of the head using the depth data; and
discard arbitrary feature points on edges of the edge map.

8. The apparatus of claim 6, wherein the processor is configured to determine the rotation matrix and the translation vector associated with the pose of the head by being configured to:
provide image coordinates of the arbitrary feature points and the depth data for corresponding arbitrary feature points to an Extended Kalman filter with states including a rotation matrix and a translation vector associated with the reference pose for the head and a current orientation and a current position; and
determine the rotation matrix and the translation vector with the Extended Kalman filter.

9. An apparatus comprising:
means for capturing a series of images with depth data of a head of a subject;
means for obtaining a reference pose for the head of the subject from one image in the series of images and using the reference pose to define a reference coordinate frame for the series of images;
means for determining a rotation matrix and a translation vector associated with a pose of the head in each image in the series of images relative to the reference coordinate frame using the depth data;
means for extracting a face on the head from a background in the series of images using the depth data, wherein the means for extracting the face from the background comprises:
means for calculating a depth of the face in each image using the depth data; and
means for segmenting out the face from the background using a threshold and the depth of the face; and
means for tracking the face in the series of images after extracting the face from the background.

10. The apparatus of claim 9, wherein the means for determining the rotation matrix and the translation vector associated with the pose of the head comprises:
means for extracting arbitrary feature points on the head in each image in the series of images; and
means for using the depth data associated with the arbitrary feature points to determine the rotation matrix and the translation vector of the pose of the head.

11. The apparatus of claim 10, further comprising:
means for generating an edge map of the head using the depth data; and
means for discarding arbitrary feature points on edges of the edge map.

12. The apparatus of claim 10, wherein the means for determining the rotation matrix and the translation vector associated with the pose of the head comprises:
means for providing image coordinates of the arbitrary feature points and the depth data for corresponding arbitrary feature points to an Extended Kalman filter with states including a rotation matrix and a translation vector associated with the reference pose for the head and a current orientation and a current position; and
means for determining the rotation matrix and the translation vector using the Extended Kalman filter.

13. A non-transitory computer-readable medium including program code executable by one or more processors stored thereon, comprising:
program code to receive a series of images with depth data of a head of a subject;
program code to obtain a reference pose for the head of the subject from one image in the series of images and use the reference pose to define a reference coordinate frame for the series of images;
program code to determine a rotation matrix and a translation vector associated with a pose of the head in each image in the series of images relative to the reference coordinate frame using the depth data;
program code to extract a face on the head from a background in the series of images using the depth data, wherein the program code to extract the face from the background comprises:
program code to calculate a depth of the face in each image using the depth data; and
program code to segment out the face from the background using a threshold and the depth of the face; and
program code to track the face in the series of images after extracting the face from the background.

14. The non-transitory computer-readable medium of claim 13, wherein the program code to determine the rotation matrix and the translation vector associated with the pose of the head comprises:
program code to extract arbitrary feature points on the head in each image in the series of images; and
program code to use the depth data associated with the arbitrary feature points to determine the rotation matrix and the translation vector of the pose of the head.

15. The non-transitory computer-readable medium of claim 14, further comprising:
program code to generate an edge map of the head using the depth data; and
program code to discard arbitrary feature points on edges of the edge map.

16. The non-transitory computer-readable medium of claim 14, wherein the program code to determine the rotation matrix and the translation vector associated with the pose of the head further comprises:
program code to provide image coordinates of the arbitrary feature points and the depth data for corresponding arbitrary feature points to an Extended Kalman filter with states including a rotation matrix and a translation vector associated with the reference pose for the head and a current orientation and a current position; and
program code to determine the rotation matrix and the translation vector using the Extended Kalman filter.

* * * * *